C. BUCKLEY.
Curtain-Fixtures.
No. 136,030.                 Patented Feb. 18, 1873.
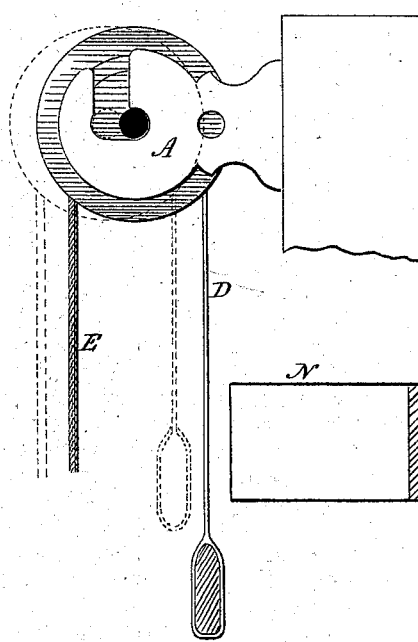
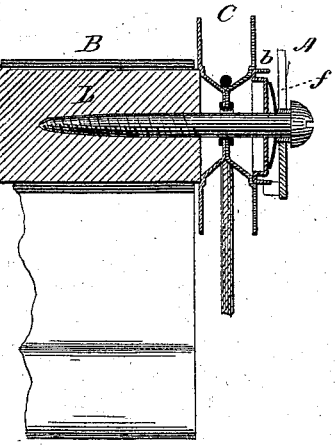
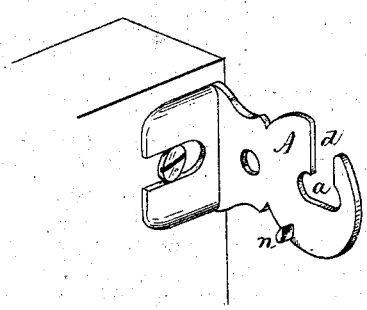
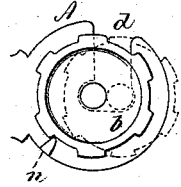
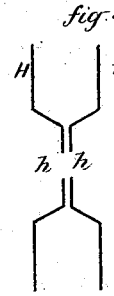
Chauncey Buckley
Inventor.

UNITED STATES PATENT OFFICE.

CHAUNCEY BUCKLEY, OF WEST MERIDEN, CONNECTICUT.

IMPROVEMENT IN CURTAIN-FIXTURES.

Specification forming part of Letters Patent No. 136,030, dated February 18, 1873.

*To all whom it may concern:*

Be it known that I, CHAUNCEY BUCKLEY, of West Meriden, in the county of New Haven and State of Connecticut, have invented a new Improvement in Curtain-Fixtures; and I do hereby declare the following, when taken in connection with the accompanying drawing and the letters of reference marked thereon, to be a full, clear, and exact description of the same, and which said drawing constitutes part of this specification, and represents, in—

Figure 1, an end view; Fig. 2, a longitudinal central section; Fig. 3, a perspective view of the bracket; Fig. 4, a diagram of a portion of the bracket and ratchet to illustrate the operation; and in Fig. 5, a vertical section of the two parts of the pulley as prepared for attachment.

This invention relates to an improvement in the curtain-fixture patented to L. L. Sawyer, July 11, 1871, the object being to avoid the use of the pawl required in Sawyer's patent; and it consists in the construction of the bracket with an elongated bearing, within which the pivot works, the said bracket constructed with a stationary stud, which, when at one extreme of the elongated bearing, engages the ratchet-wheel, the said elongated bearing allowing the drawing of the roll and ratchet so far from the said stud that the roll may revolve without the engagement between the stud and the ratchet; also, in combining with a curtain-fixture, a tube or cylinder to be set onto the ends of the curtain-roll, so that the fixture, by means of the said tube, may be secured to the roll.

A is the bracket for the support of that end of the roll to which the adjusting mechanism is attached, the bearing *a* for the pivot being elongated about two diameters of the pivot, as seen in Figs. 1 and 3. A vertical slot, *d*, opens upward for the insertion of the pivot. On the end of the roll B a pulley, C, is attached, and outside this pulley a ratchet or toothed wheel, *b*, is arranged, the relative position of this toothed wheel *b* to the bracket being shown detached in Fig. 2. I construct the bracket with a projecting stud, *n*, as seen in Figs. 3 and 4.

The curtain D hanging upon the back side of the roll will hold the pivot back in the bearing, as seen in Fig. 1, which is the position also seen in Fig. 4. In this position the teeth of the ratchet engage the projection *n*, as seen in Fig. 1, which prevents that from turning, and creates the friction to hold the curtain; but when the hand is applied to the cord E, which is around the pulley C, and drawn upon to cause the pulley and roll to revolve, the pivot will roll back in the bearing to the position denoted in broken lines, Fig. 4, thus disengaging the teeth of the wheel from the projection *n*; and when the power which caused this operation is removed the weight of the curtain acting in the opposite direction will return the roll and pivot to the first position and re-engage with the projection *n*.

In order to cheapen the construction of the pulley I form it from two disks, H H, see Fig. 5. These are struck up from sheet metal, their central portion depressed, as at *h*, the outer surface of this depression forming the bottom of the groove, of which the disks form the sides. These two parts are united at the center either by an eyelet, as in Fig. 2, or by forming what corresponds to one of the disks to pass through the perforation in the other disk, and be closed down upon the opposite side.

In curtain-fixtures of this character several parts are necessary for the attachment of the fixture to the roll—that is, either the parts which go to make up the mechanism or the pulley and several screws of the common pulley-fixtures—and a person often experiences difficulty in properly applying such fixtures to the roll. To avoid this difficulty I attach the fixture to a short piece of roll, L, of the standard diameter for curtain-rolls, and set this into the end of a cylinder or tube, N, of sheet metal, this tube being so much longer than the piece L that when the tube is set onto the end of the roll proper it will serve to secure the fixture to such roll proper, and thus prepared the fixture is ready for market; and the person who applies the fixture has only to cut the roll the required length and insert it into the open end of the cylinder N.

By preference I apply the fixture for both ends of the roll in the same manner, and this cylinder and block are applicable alike to a large majority of the curtain-fixtures.

I claim as my invention—

1. The bracket A, constructed with an elongated bearing, $a$, and projection $n$, combined with the toothed wheel $b$ attached to the roll, substantially as and for the purpose described.

2. In combination with a curtain-fixture adapted for rolls, the tube N and block L, substantially as and for the purpose specified.

CHAUNCEY BUCKLEY.

Witnesses:
 ORVILLE H. PLATT,
 SAML. T. BIRDSALL.